Oct. 7, 1952     Q. C. JOHNSON     2,612,819

GUN MOUNT

Filed July 5, 1949

INVENTOR.
QUINTON C. JOHNSON

BY *William R. Lane*

ATTORNEY

Patented Oct. 7, 1952

2,612,819

UNITED STATES PATENT OFFICE 2,612,819

GUN MOUNT

Quinton C. Johnson, Torrance, Calif., assignor to North American Aviation, Inc.

Application July 5, 1949, Serial No. 103,063

6 Claims. (Cl. 89—37)

This invention relates to a mounting arrangement for guns.

It is an object of this invention to provide a gun mounting means which eliminates the use of a cradle in the attachment of automatic guns to supporting structures.

It is a further object of this invention to provide a mounting arrangement which enables the gun to be easily and quickly mounted in close places and to members not in alignment, such as is commonly encountered in aircraft construction.

It is yet another object of this invention to provide a gun mount wherein the supporting post of the mount is in vertical alignment with the centerline of the gun at all times.

It is still another object of this invention to provide a gun mount which readily allows minor adjustments in the mounting arrangement.

Other objects of invention will become apparent from the following description taken in connection with the accompanying drawings, in which Fig. 1 is an elevational view of a gun mounting in accordance with the invention;

Figure 2:
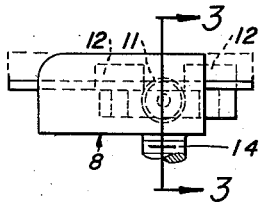
Fig. 2 is an elevational view of a portion of the rear mount.
Figure 4:
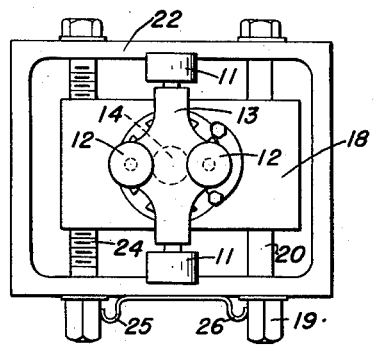
Fig. 4 is a top plan view of the rear mount taken along the line 4—4 of Fig. 1.
Figure 3:
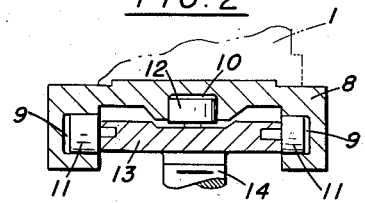
Fig. 3 is a transverse sectional view of the mount taken along the line 3—3 of Fig. 2.
Figure 7:
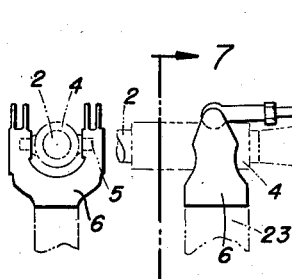
Fig. 7 is an end view taken along the line 7—7 of Fig. 1.
Figure 1:
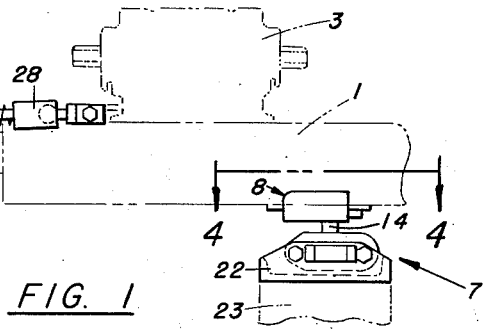
Figure 5:
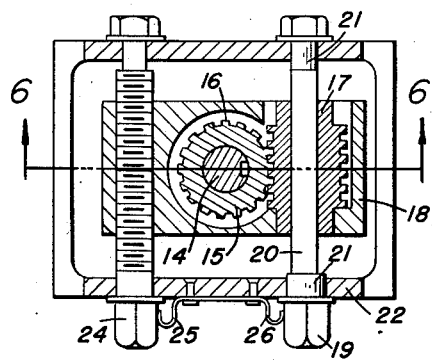
Fig. 5 is a sectional view of the rear mount taken along the line 5—5 of Fig. 6.
Figure 6:
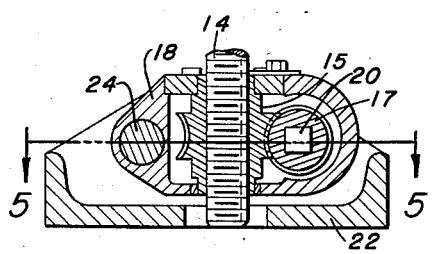
Fig. 6 is a sectional view taken along the line 6—6 of Fig. 5.

Referring to the drawings there is shown a gun 1, of the recoiling type, having a barrel 2 attached thereto in a well known manner, and a free magazine 3 operatively associated therewith in a manner well known in the art. A portion of the barrel 2 is encased by sleeve 4 for supporting the forward portion of the gun. The sleeve 4 is provided with trunnions 5 for attachment to a yoke or front mount 6. The rear portion of the gun is adapted to be supported on a mount referred to generally as 7. This mount comprises a slideway 8 adapted to be attached to the gun in any suitable manner and provided with recesses 9 and 10 for receiving pairs of roller bearings 11 and 12, respectively. These bearings are trunnioned in a guideway 13 having a post 14 threadedly received in nut 15 which in turn is provided with teeth 16 for engagement with corresponding teeth on member 17. Member 17 is suitably mounted in a block 18 and is fitted on bolt 19 having a square portion 20 for engagement with member 17, and round portions 21 for rotatably mounting the bolt in the gun mount member 22. Member 22 in turn is adapted to be attached to supporting structure 23, such as a part of an aircraft or the like. Block 18 is adapted to be shifted laterally with respect to member 22 by reason of its threaded engagement with bolt 24 rotatably received in member 22. Spring detents 25 and 26 hold bolt members 19 and 24 in adjusted position. This arrangement allows post 14 to be in vertical alignment with the centerline of gun 1 at all times, thereby increasing the accuracy of firing of the gun, and avoiding malfunctioning of the same by reason of stresses which may obtain if eccentric mounts are used.

This invention is particularly useful in instances when the gun recoils with respect to feed magazine 3. Such movement is utilized in a manner well known in the art to effect feeding operation of the cartridges. Recoil movement of the gun is controlled in the usual manner by means of a spring between the barrel and the front mount, as is well known in the art. In view of the fact that the feed magazine remains stationary with respect to the gun, and it is often difficult to find mounting means for the feed magazine on the supporting structure such as an aircraft, it is necessary that the feed magazine be fixed with respect to the mounts. Accordingly, a tie rod 27 is adapted to be attached at one end to the front mount 6 and at the other end to the feed magazine 3. A universal connection 28 comprising a ball-and-socket joint, enables minor adjustments of the mount with respect to the feed magazine, and also a limited amount of rotative movement between mount 6 and feed magazine 3, as well as mount 22. This permits attachment of the gun in close places where members run in varying directions, such as is commonly encountered in aircraft structure.

In the operation of the invention front mount 6 and rear mount 22 are suitably attached to supporting structure 23. Thereupon, sleeve member 4 is attached through trunnions 5 to front mount 6, and the barrel of the gun slid through the sleeve and adjusted so that rollers 11 and 12 are received in their respective recesses or guideways 9 and 10. Tie rod 27 is adjusted so that its respective ends may be connected through ball-and-socket joint 28. This joint permits adjustment for variations in length between the front and rear mounts of various guns, and also permits the front mount to be placed at a slight angle with respect to the rear mount, if necessary for convenience of attachment to supporting structure. The gun is then sighted and adjusted by operation of members 19 and 24, operation of member 19 causing vertical movement of the gun through the teeth on members 15 and 17. Lateral adjustment, or wind correction, of the gun is obtained by rotation of member 24, which in turn causes lateral movement of block 18 in a direction transverse to the longitudinal axis of the gun. It may be noted that, during each lateral movement, member 17 slides with respect to portion 20 of bolt 19. This arrangement is particularly desirable because it enables post 14 of the gun to be in vertical alignment with the centerline thereof at all times.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A rear mount for a gun of the recoiling type comprising means for supporting the rear portion of said gun with freedom for longitudinal sliding movement including a post in alignment with the centerline of the gun at all times, a block for carrying said post, means for moving said block laterally with respect to a support, and means for moving said post vertically.

2. A rear mount for a gun of the recoiling type comprising support attaching means, a block carried by said support attaching means, means for moving said block laterally with respect to said support, a post carried by said block, means for moving said post vertically with respect to said block, a guideway integral with the upper part of said post, and a slideway on said gun for engagement with said guideway with said post in alignment with the centerline of the gun at all times.

3. A rear mount for a gun of the recoiling type comprising a slideway attached to said gun, a guideway adapted to be attached to a support, bearing means between said slideway and guideway in vertical alignment with the centerline of the gun for absorbing lateral forces on the gun, horizontal bearing means laterally spaced on either side of the centerline of the gun for absorbing vertical forces on the gun, and a post attached to said guideway in alignment with the vertical centerline of the gun.

4. A device as recited in claim 3 in which said first named bearing means comprises rollers in tandem.

5. A device as recited in claim 3 and further including a block for carrying said post, means for moving said block laterally with respect to said support, and means for moving said post vertically.

6. A mounting arrangement for a gun, said gun having a stationary part and a recoiling part, said mounting including a yoke having a trunnioned sleeve portion for supporting the barrel of the gun, a slideway for slidably receiving the rear portion of the gun, and a universal connection between said yoke and the stationary part of the gun, whereby the yoke may be angularly mounted with respect to the slideway; a guideway including a post mounted in vertical alignment with the centerline of the gun, a block for carrying said post, means for adjusting said post vertically with respect to said block, and means for moving said block laterally.

QUINTON C. JOHNSON.

REFERENCES CITED

The following references are of record in the file of this patent:

UNITED STATES PATENTS

| Number | Name | Date |
| --- | --- | --- |
| 1,939,699 | Hofstetter | Dec. 19, 1933 |
| 2,291,867 | Birkigt | Aug. 4, 1942 |
| 2,335,835 | Zietlow | Nov. 30, 1943 |
| 2,350,122 | Martin | May 30, 1944 |
| 2,376,835 | Trotter | May 22, 1945 |
| 2,380,773 | McMullen | July 31, 1945 |